United States Patent
Blake

[15] 3,649,076
[45] Mar. 14, 1972

[54] INERTIA SAFETY BELTS

[72] Inventor: Minden Vaughan Blake, Carnaton, Woodlands Road East, Virginia Water, England

[22] Filed: July 22, 1970

[21] Appl. No.: 57,110

[30] Foreign Application Priority Data

July 28, 1969 Great Britain.....................37,740/69

[52] U.S. Cl............................................297/386, 188/134
[51] Int. Cl. ..................................................A62b 35/60
[58] Field of Search.............297/388, 389, 385; 280/150 SB; 244/122.2, 122; 188/134

[56] References Cited

UNITED STATES PATENTS

| | | | |
|---|---|---|---|
| 3,419,308 | 12/1968 | Adri | 297/389 X |
| 3,486,792 | 12/1969 | Stoffel | 297/389 X |
| 3,533,659 | 10/1970 | Major | 297/389 |

Primary Examiner—James T. McCall
Attorney—Mawhinney & Mawhinney

[57] ABSTRACT

One end of a safety belt is attached to a slider which can move vertically up and down a box-section guideway. In each of several cavities formed by opposed recesses in the slider and an adjacent bar is a diamond-shaped tooth. The slider and the bar are held together by a spring. When the slider is jerked upwards the parallel motion linkage formed by the teeth causes the assembly of slider and bar to separate and jam in the guideway.

3 Claims, 2 Drawing Figures

Patented March 14, 1972  3,649,076
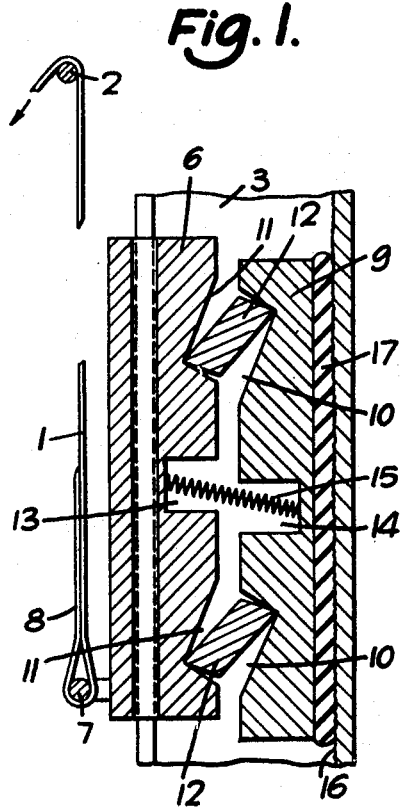
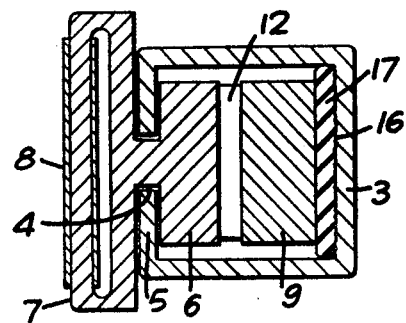

# 3,649,076

INERTIA SAFETY BELTS

FIELD OF THE INVENTION

This invention relates to inertia safety belts for use in motor cars or other vehicles.

BACKGROUND OF THE INVENTION

A fairly large number of proposals for inertia safety belts have been made. Many of these proposals have required fairly complex constructions which are not easily repaired or replaced. In many proposed constructions the locking action is not very positive and the acceleration of the belt necessary to cause locking is dependent on the effective length of the belt. A number of proposals, especially those on which the belt is wound on a reel, use more belt material, which is in general quite expensive, than is really necessary.

SUMMARY OF THE INVENTION

According to the present invention an inertia safety belt comprises a slider slidable up and down a guideway, a belt connected to the slider and extending upwardly therefrom, a member movable under gravity down the guideway with said slider, a linkage linking the slider and member, the linkage providing a relative movement, transverse the guideway, between the slider and the member when the slider is jerked upwardly, the said relative movement causing the assembly of slider and member to jam in position along the guideway.

BRIEF DESCRIPTION OF THE DRAWINGS

The accompanying drawings illustrate by way of example a preferred embodiment of the invention. In the drawings:

FIG. 1 illustrates a vertical section through an inertia safety belt mechanism incorporating the invention; and FIG. 2 illustrates a horizontal section through the mechanism illustrated by FIG. 1.

DESCRIPTION OF THE PREFERRED EMBODIMENT

Referring now to the drawings, a seat belt 1 extends upwardly over a bar 2 and subsequently downwardly towards and around the user of the belt. At an appropriate position in the vehicle in which the mechanism is mounted there is a guideway, preferably vertically mounted, in this case formed by a box section guideway 3 having a vertical slot 4 running down a front wall 5 of the guideway. Slidable up and down the guideway is a slider 6 which extends through the slot to a clasp 7 to which an end loop 8 of the belt 1 is attached. Within the guideway 3 is also a member 9 in the form of a recessed bar. The member 9 is pivotally linked with the slider 6 such that sudden upward movement of the slider 6 causes relative movement of the slider 6 and member 9 in a direction transverse the guideway. As will be explained hereinafter this provides jamming of the assembly of slider and member in position along the guideway thereby preventing further movement of the belt.

The member 9 has recesses 10 approximately opposite complementary recesses 11 in the slider. Each pair of recesses 10 and 11 enclose a diamond-shaped tooth 12 extending from a lower notch in the recess 11 to an upper notch in the recess 10. The teeth 12 provide a parallel motion linkage between the slider and the member 9. The slider 6 and the member 9 have approximately aligned central recesses 13 and 14 respectively in which is disposed a light coil spring 15 tending to pull the slider 6 and member 9 together.

An outside face of the member 9, that is to say the face adjacent a rear inside face 16 of the guideway 3, carries a rubber friction pad 17. The spring 15 normally holds the friction pad away from the adjacent rough inner face 16 of the guideway.

If the slider 6, under the action of the belt 1, is moved upwards below an acceleration of, for example, 0.5 g., this value of acceleration being adjustable by altering the strength of the spring, the spring holds the member 9 close against the slider so that there is virtually no resistance to the movement of the belt. Thus the belt may be pulled out while a user is settling in his seat. Gravity acting on the assembly of the slider 6 and member 9 will return the assembly and belt to a position where the belt is drawn fairly tightly over the user. If the slider is accelerated upwards above the set value of acceleration, owing to a sudden shock load on the belt 1, the gravitational force acting on the member 9 and the pivoting of the linkage between the slider 6 and member 9 will cause the assembly of slider and member to expand in a sense transverse the guideway. This expansion will bring the friction pad 17 into engagement with the rough face 16 of the guideway and the slider will become jammed.

When the pull in the belt is released the rubber friction pad expands and the slider is freed. Thus the mechanism can lock almost instantaneously when a set acceleration is reached and releases substantially immediately the seat belt relaxes.

Owing to the gravitational force acting on the slider assembly the pull on the belt is under normal conditions virtually constant. The acceleration of the belt to produce locking or jamming is independent of the length of the belt.

The guideway may be built into a door pillar or the back of a seat in a vehicle.

A small pendulum may be pivoted on the slider and arranged so that its deviation causes the separation of the slider 6 and member 9: this would provide an additional means of stopping movement of the belt. A catch may be coupled to the pendulum in order to facilitate manual securing of the sliding mechanism in any desired position.

One advantage of the present construction is its easy adaptation for actuation in accord with the movement or orientation by the vehicle itself. For example, a tumbler may be balanced in a recess in the slider and arranged to prevent the slider 6 and member 9 separating until the tumbler is toppled by a given deceleration such as 0.5 g. or a given angle of attitude such as 30° from the vertical.

I claim:

1. An inertia safety belt mechanism comprising a generally vertically oriented guideway, a slider slidable up and down the guideway, a belt connected to the slider and extending upwardly therefrom, a member movable down the guideway with said slider under gravity, and a parallel motion linkage linking the slider and the said member, the linkage being responsive to an upward jerk of said slider to cause relative separation, transverse the guideway, of the slider and the said member and thereby to cause the assembly of slider and member to jam in position along the guideway; wherein the slider and member are coupled by spring means resisting the said relative movement and are arranged inside the guideway; and in which the said linkage allows the slider and member to separate, the guideway limits the separation of the slider and member and the guideway and member have frictionally engageable surfaces.

2. A mechanism as claimed in claim 1 in which the slider and member include facing recesses forming enclosures in each of which a tooth extends from a lower notch in the respective recess formed in the slider to an upper notch formed in the respective recess formed in the member.

3. A mechanism as claimed in claim 1 wherein the slider extends through a slot in the guideway to a clasp for the attachment of the said belt.

* * * * *